No. 612,453. Patented Oct. 18, 1898.
J. H. BIRD & G. P. CARROLL.
CLUTCH SPROCKET.
(Application filed Oct. 7, 1897.)
(No Model.)
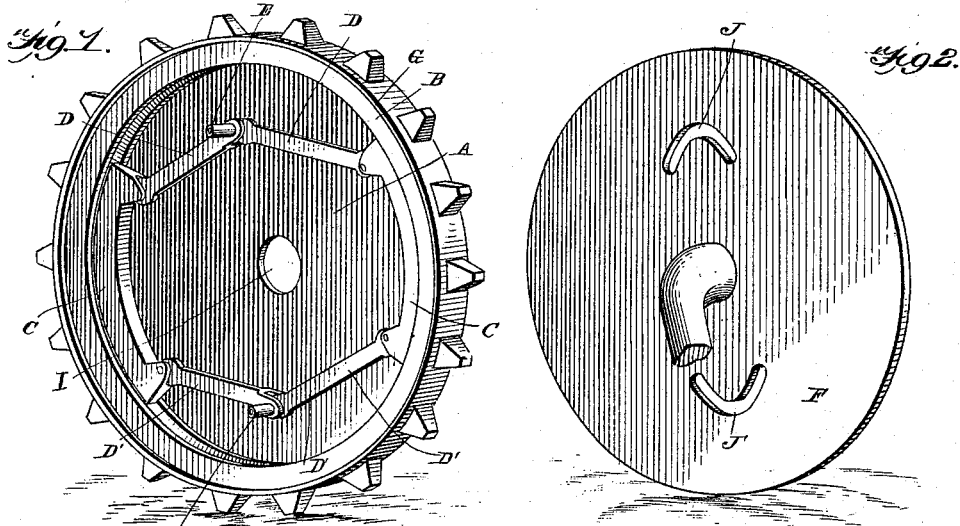
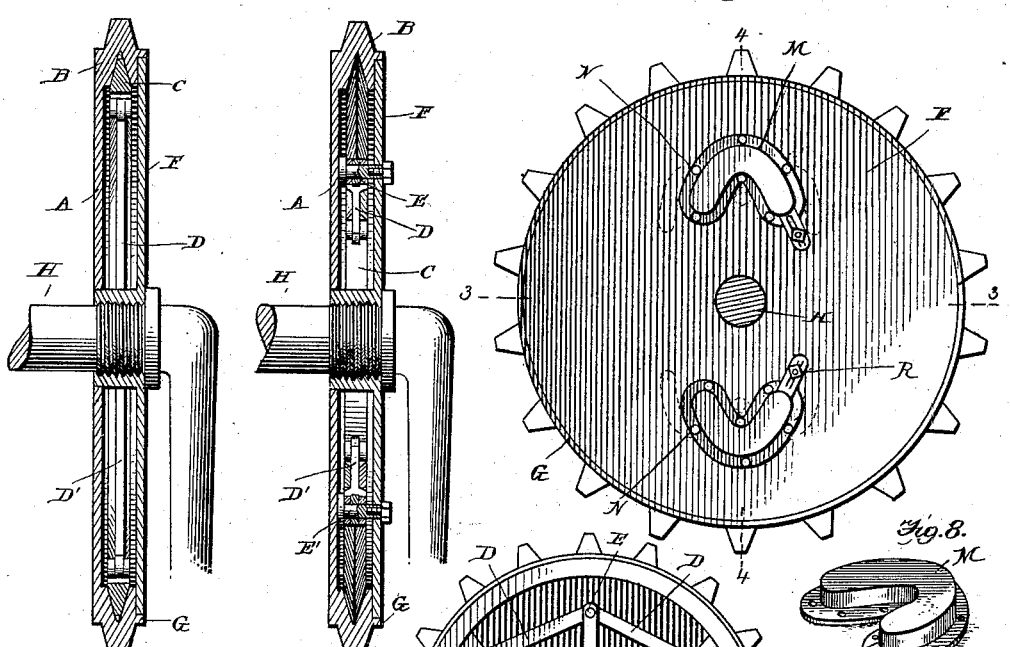
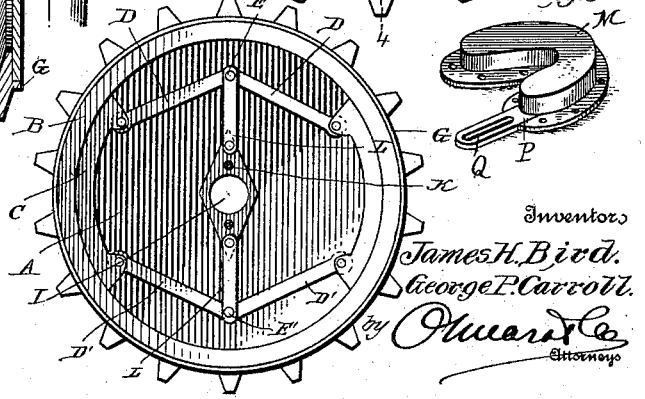
Witnesses
Inventors
James H. Bird.
George P. Carroll.

UNITED STATES PATENT OFFICE.

JAMES H. BIRD AND GEORGE P. CARROLL, OF MANKATO, MINNESOTA.

CLUTCH-SPROCKET.

SPECIFICATION forming part of Letters Patent No. 612,453, dated October 18, 1898.

Application filed October 7, 1897. Serial No. 654,392. (No model.)

*To all whom it may concern:*

Be it known that we, JAMES H. BIRD and GEORGE P. CARROLL, residing at Mankato, in the county of Blue Earth and State of Minnesota, have invented a new and useful Clutch-Sprocket, of which the following is a specification.

Our invention relates to sprocket-wheels, and more especially to sprocket-wheels for bicycles, tricycles, and like vehicles, although it is adapted for use with many kinds of driving-wheels.

The general object of our invention is to furnish means whereby a sprocket or other driving wheel will be locked to turn with the shaft while power is applied to turn the shaft in either direction and free to rotate independent of the shaft when the shaft is held stationary.

A special object of our invention is to provide means whereby the power applied to the cranks of bicycles and analogous vehicles will be transmitted to the sprocket-wheels to turn them and propel the vehicles; but when the cranks are held stationary, preferably with one in its lowest and the other in its highest position, the cranks and sprocket-wheel will be disconnected and the sprocket-wheel be free to rotate independent of the cranks, thus admitting of coasting with the feet on the pedals.

With these objects in view our invention consists in a sprocket or other driving wheel with clutch mechanism operated from the shaft, whereby the power from the shaft will be transmitted to the wheel, but when the shaft is stopped the wheel will be free to rotate thereon independently.

Our invention further consists in a sprocket-wheel for bicycles or other vehicles provided with one or more clutch-shoes and means whereby these shoes will be kept in contact with the wheel and the wheel caused to rotate with the crank-shaft during such time as the rider is either back or forward pedaling, but will be free to rotate independently of the crank-shaft when the pedals are held stationary.

Our invention further consists in a sprocket-wheel for bicycles or other analogous vehicles, formed hollow with a seat on one side to receive a disk secured to the crank-shaft and a clutch mechanism in the hollow of the wheel connected to the disk by means whereby when the disk is rotated in the act of pedaling either back or forward the disk and wheel will be locked together, such mechanism causing the wheel and disk to be disconnected when the pedals are held one up and the other down.

Our invention further consists in the improved construction, arrangement, and combination of parts hereinafter fully described, and afterward pointed out in the claims.

In order to enable others skilled in the art to which our invention most nearly appertains to make and use the same, we will now proceed to describe its construction and operation, having reference to the accompanying drawings, forming part of this specification, in which—

Figure 1 is a perspective view illustrating a sprocket-wheel and inclosed clutch mechanism. Fig. 2 is a perspective view illustrating the disk secured to the crank-shaft. Fig. 3 is a sectional view on the line 3 3 of Fig. 5. Fig. 4 is a sectional view on the line 4 4 of Fig. 5, the dust-guards being omitted. Fig. 5 is a view in side elevation, with the crank-shaft in section, showing also the dust-guards for the slots and the brake-controlling mechanism. Fig. 6 is a side elevation illustrating the same parts as in Fig. 1, but in a slightly-modified form. Fig. 7 is a fragmentary detail sectional view on the line 7 7 of Fig. 5. Fig. 8 is a detail perspective view of the dust-guards for the slots and the brake-controlling slide.

Like letters of reference mark the same parts wherever they occur in the various figures of the drawings.

Referring to the drawings by letters, A is the web of a sprocket-wheel having its rim B projected laterally and forming a hollow in which are located two brake or clutch shoes C, adapted, when pressed outward, to engage frictionally with the interior surface of the rim B, the inner surface of the rim and the outer surface of the shoes being V-shaped to insure close contact and greater friction. These shoes C are pivotally connected at their ends with toggle-levers D D and D' D', the levers D D being pivotally connected at their inner ends by pin E and levers D' D' by pin E'.

F is a disk which is adapted by size and shape to fit on the face of the rim B and inside of an annular lateral flange G, projecting therefrom, in a manner to permit of its free rotation independent of the sprocket-wheel. This disk is secured to the crank-shaft H, which when the parts are assembled passes through a central opening I in the web A of the sprocket-wheel. In the disk, at points diametrically opposite, are two curved slots J J' with their ends ranging inward, and the pins E and E' pass into or through these slots and have nuts outside the disk.

In operation when power is applied to the pedals and the crank-shaft turned the disk F will be turned with it and the pins E E' will be forced along in the slots J and J' from their normal central position therein toward the center. This will cause the pairs of toggle-levers D D and D' D' to move toward each other at their centers, and thus force the shoes C in violent contact with the rim B of the wheel, and inasmuch as the force of this contact will be increased exactly as the power applied to the crank-shaft the wheel and disk will be locked together and caused to rotate as one single body with the crank-shaft. When the pins E E' are in their normal central position in the slots J J', the pedals will be one in its lowest position and the other in its highest position, or in any predetermined opposite positions in which it may be desired to have them, and the wheel will be free to turn on the shaft and disk and independently therefrom; but as soon as the pedals are operated in either direction the locking operation will take place, as before stated, and the wheel, disk, and shaft will move together.

In order to prevent the entry of dust into the interior of the wheel through the slots, dust-guards are provided, consisting of inverted boxes M of an outline corresponding with the slots and secured to the plate F by means of screws or rivets N, passing through lateral flanges projecting from the boxes and lying upon said plate. One end of each of these flanges is cut away to admit of the passage therethrough into the boxes of slide-plates P, having longitudinal slots Q, through which pass bolts R to secure them to the plate F, said slots Q being in line with the adjacent ends of the slots in the plate F. Within the boxes the slide-plates are provided with right-angular flanges S, which lie in the path of the heads of the bolts or pins E E, whereby the pins will be stopped when the rider is back-pedaling before the brake-shoes are too tightly pressed into the V-shaped interior surfaces of the rim.

In Fig. 6 we have illustrated a mechanism for carrying out our invention of slightly different form. In this construction the slots in the disk are omitted and a block or plate K secured to the disk at the center, so as to turn therewith. Links L are pivotally connected at their inner ends with the block K and at their outer ends to the pins E E' of the toggle-levers D D D' D', the parts being shown in their normal or inoperative position. As soon as the crank-shaft is rotated in either direction, carrying the disk and block K with it, the toggle-levers will be pulled toward the center and force the shoes into contact with the rim of the wheel, with the results before described.

The advantages attending the use of our invention are numerous and will be obvious from the foregoing description. While power is necessary to propel the wheel, the contact is maintained, but whenever the wheel will turn of itself the rider can rest with his feet on the stationary pedals, thus avoiding the necessity of moving them with the pedals while they are carried around by the wheel and obviating the necessity of taking the feet off the pedals in order to coast. By a backward pressure on the pedals the brake-shoes are forced into the V-shaped grooves in the interior of the rim and serve as brakes to retard or stop the movement of the wheel.

While we have illustrated and described what we believe to be the best means now known to us for carrying out our invention, we do not wish to be understood as limiting ourselves to the exact construction and arrangement shown and described, but hold that such slight changes and variations as might suggest themselves to the ordinary mechanic would properly fall within the limit and scope of our invention.

Having thus fully described our invention, what we claim as new, and desire to secure by Letters Patent of the United States, is—

1. The combination of a hollow sprocket-wheel, the shaft upon which it is loosely mounted, a disk fixed on the shaft, a plurality of clutch-shoes in the hollow wheel, toggle-levers connecting the shoes, and connections between the disk and toggle-levers whereby the turning of the shaft and disk will cause the shoes to contact with the wheel and lock the wheel, disk and shaft together, substantially as described.

2. The combination of a hollow sprocket-wheel, the shaft upon which it is loosely mounted, a disk fixed on the shaft, a plurality of clutch-shoes in the hollow wheel, toggle-levers connecting the shoes, the pins by which the pairs of toggle-levers are centrally connected, the disk being provided with V-shaped grooves in which said pins operate, and adjustable slides for limiting the movement of the pins in said slots, substantially as described.

3. The combination of the shaft with the sprocket-wheel made hollow and mounted loosely thereon, a disk fixed on the shaft and provided with V-shaped slots, a plurality of clutch-shoes in the hollow wheel, toggle-levers connecting the shoes, pins by which the pairs of toggle-levers are centrally connected, operating in said grooves, dust-guards over said slots having flanges and connecting-screws, and adjustable slides working through said flanges for limiting the movement of the pins in the slots, substantially as described.

4. The combination of a hollow sprocket-wheel, the shaft upon which it is loosely mounted, a disk fixed on the shaft, a plurality of clutch-shoes in the hollow wheel, toggle-levers connecting the shoes, and pins by which the pairs of toggle-levers are centrally connected, the disk being provided with V-shaped grooves in which said pins operate, substantially as and for the purpose set forth.

JAMES H. BIRD.
GEORGE P. CARROLL.

Witnesses:
JEAN A. FLITTIE,
JESSIE BEQUETTE.